(12) United States Patent
Zhu

(10) Patent No.: US 8,008,420 B2
(45) Date of Patent: Aug. 30, 2011

(54) ORGANOHYDROGENPOLYSILOXANE RESIN AND SILICONE COMPOSITION

(75) Inventor: Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 462 days.

(21) Appl. No.: 11/662,858

(22) PCT Filed: Oct. 31, 2005

(86) PCT No.: PCT/US2005/039377
§ 371 (c)(1),
(2), (4) Date: Feb. 3, 2010

(87) PCT Pub. No.: WO2006/055232
PCT Pub. Date: May 26, 2006

(65) Prior Publication Data
US 2010/0130702 A1 May 27, 2010

Related U.S. Application Data

(60) Provisional application No. 60/629,460, filed on Nov. 19, 2004, provisional application No. 60/647,608, filed on Jan. 27, 2005, provisional application No. 60/653,032, filed on Feb. 15, 2005, provisional application No. 60/652,445, filed on Feb. 11, 2005.

(51) Int. Cl.
*C08G 77/12* (2006.01)
*C08G 77/38* (2006.01)
*C08G 77/04* (2006.01)

(52) U.S. Cl. .............. 528/33; 528/31; 525/477

(58) Field of Classification Search .............. None
See application file for complete search history.

(56) References Cited

U.S. PATENT DOCUMENTS

| 3,419,593 | A |   | 12/1968 | Willing |   |
|---|---|---|---|---|---|
| 4,087,585 | A |   | 5/1978 | Schulz |   |
| 4,766,176 | A |   | 8/1988 | Lee et al. |   |
| 5,017,654 | A |   | 5/1991 | Togashi et al. |   |
| 5,194,649 | A |   | 3/1993 | Okawa |   |
| 5,527,873 | A |   | 6/1996 | Kobayashi et al. |   |
| 5,747,608 | A |   | 5/1998 | Katsoulis et al. |   |
| 5,861,448 | A |   | 1/1999 | Griffith et al. |   |
| 6,013,824 | A | * | 1/2000 | Wood | 556/467 |
| 6,310,146 | B1 |   | 10/2001 | Katsoulis et al. |   |
| 6,355,724 | B1 |   | 3/2002 | LeGrow et al. |   |
| 6,420,504 | B1 | * | 7/2002 | Yoshitake et al. | 526/279 |
| 6,509,423 | B1 |   | 1/2003 | Zhu |   |
| 6,617,674 | B2 | * | 9/2003 | Becker et al. | 257/678 |
| 6,646,039 | B2 |   | 11/2003 | Li et al. |   |
| 6,689,859 | B2 |   | 2/2004 | Li et al. |   |
| 2004/0002571 | A1 | * | 1/2004 | Sakamoto et al. | 524/588 |
| 2005/0256286 | A1 | * | 11/2005 | Asch et al. | 528/31 |

* cited by examiner

*Primary Examiner* — Robert Loewe
(74) *Attorney, Agent, or Firm* — Larry A. Milco

(57) ABSTRACT

An organohydrogenpoly siloxane resin having the formula (I): $(R^1R^3{}_2SiO_{1/2})w(R^3{}_2SiO_{1/2})x(R^1SiO_{3/2})y(SiO_{4/2})z$, wherein $R^1$ is $C_1$ to $C_{10}$ hydrocarbyl or $C_1$ to $C_{10}$ halogen-substituted hydrocarbyl, both free of aliphatic unsaturation, $R^3$ is $R^1$ or an organosilylalkyl group having at least one siliconbonded hydrogen atom, w is from 0 to 0.8, x is from 0 to 0.6, y is from 0 to 0.99, z is from 0 to 0.35, w+x+y+z=1, y+z/(w+x+y+z) is from 0.2 to 0.99, w+x/(w+x+y+z) is from 0.01 to 0.8, and at least 50 mol % of the groups $R^3$ are organosilylalkyl; a silicone composition containing the resin, and a cured silicone resin prepared by curing the silicone composition.

10 Claims, 2 Drawing Sheets

ORGANOHYDROGENPOLYSILOXANE RESIN AND SILICONE COMPOSITION

CROSS REFERENCE TO RELATED APPLICATIONS

This application is a U.S. national stage filing under 35 U.S.C. §371 of PCT Application No. PCT/US2005/039377 filed on 31 Oct. 2005, currently pending, which claims the benefit of U.S. Provisional Patent Application No. 60/629,460 filed 19 Nov. 2004; U.S. Provisional Application No. 60/647,608 filed 27 Jan. 2005, U.S. Provisional Application No. 60/653,032 filed Feb. 15, 2005, and U.S. Provisional Application No. 60/652,445 filed 11 Feb. 2005 under 35 U.S.C. §119 (e). PCT Application No. PCT/US2005/039377 and U.S. Provisional Patent Application No. 60/629,460, 60/647,608, 60/652,445 and 60/653,032 are hereby incorporated by reference.

FIELD OF THE INVENTION

The present invention relates to an organohydrogenpolysiloxane resin and more particularly to an organohydrogenpolysiloxane resin containing organosilylalkyl groups having at least one silicon-bonded hydrogen atom. The present invention also relates to a silicone composition containing the resin and to a cured silicone resin prepared by curing the composition.

BACKGROUND OF THE INVENTION

Silicones are useful in a variety of applications by virtue of their unique combination of properties, including high thermal stability, good moisture resistance, excellent flexibility, high ionic purity, low alpha particle emissions, and good adhesion to various substrates. For example, silicones are widely used in the automotive, electronic, construction, appliance, and aerospace industries.

Silicone compositions comprising an organopolysiloxane resin, organohydrogensiloxane, and hydrosilylation catalyst are known in the art. The organopolysiloxane resin is typically a copolymer containing T and/or Q siloxane units in combination with M and/or D units. However, such compositions cure to form silicone products having relatively low fracture toughness, rendering them unsatisfactory for certain applications, such as fiber-reinforced composites, interlayer dielectrics, and abrasion resistant coatings.

Various approaches to improving the fracture toughness of cured silicone resins are reported in the literature. For example, U.S. Pat. No. 5,747,608 to Katsoulis et al. discloses a rubber-modified rigid silicone resin comprising a copolymerized reaction product of an organosilicone resin and a silicone rubber. The '608 patent discloses, inter alia, addition-curable silicone resin compositions.

U.S. Pat. No. 6,310,146 to Katsoulis et al. discloses a hydrosilylation reaction curable composition comprising a silsesquioxane copolymer, a silyl-terminated hydrocarbon, and a hydrosilylation reaction catalyst. The '146 patent also teaches that the cured silsesquioxane resin has improved strength and toughness without significant loss of modulus.

U.S. Pat. No. 6,509,423 to Zhu discloses a silicone resin composition comprising (A) 100 parts by weight of an organopolysiloxane resin containing an average of greater than two alkenyl groups per molecule and having less than 1.5 mole % of silicon-bonded hydroxy groups, (B) an organohydrogensilane in an amount sufficient to cure the composition, (C) an effective amount of an inorganic filler, and (D) a catalytic amount of a hydrosilylation catalyst. The '423 patent teaches that the silicone composition cures to form a silicone product having a low coefficient of thermal expansion and superior fracture toughness.

U.S. Pat. No. 6,689,859 to Li et. al. discloses a hydrosilylation reaction curable composition comprising a) a silsesquioxane polymer, (b) a mixture of silane and/or siloxane cross-linking compounds and c) a hydrosilylation reaction catalyst. The '859 patent teaches that the curable composition is cured to form a cured resin having high fracture toughness and strength without the loss of elastic modulus.

U.S. Pat. No. 6,646,039 to Li et. al. discloses a hydrosilylation reaction curable composition comprising a) a silsesquioxane polymer, b) a cross-linking compound, c) a hydrosilylation reaction catalyst, and d) colloidal silica having a surface coating formed thereon. The '039 patent teaches that the curable composition is cured to form a cured resin having high fracture toughness and strength without the loss of elastic modulus and glass transition temperature.

Although the preceding references disclose silicone compositions that cure to form silicone products having high fracture toughness, the compositions are unsatisfactory for certain applications, for example, molding and encapsulation, which require higher viscosity and lower flow.

Consequently, there is a need for a hydrosilylation addition-curable silicone composition having higher viscosity that cures to form a silicone product having superior fracture toughness.

SUMMARY OF THE INVENTION

The present invention is directed to an organohydrogenpolysiloxane resin having the formula:

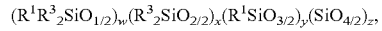

$(R^1R^3{}_2SiO_{1/2})_w(R^3{}_2SiO_{2/2})_x(R^1SiO_{3/2})_y(SiO_{4/2})_z$, wherein $R^1$ is $C_1$ to $C_{10}$ hydrocarbyl or $C_1$ to $C_{10}$ halogen-substituted hydrocarbyl, both free of aliphatic unsaturation, $R^3$ is $R^1$ or an organosilylalkyl group having at least one silicon-bonded hydrogen atom, w is from 0 to 0.8, x is from 0 to 0.6, y is from 0 to 0.99, z is from 0 to 0.35, w+x+y+z=1, y+z/(w+x+y+z) is from 0.2 to 0.99, w+x/(w+x+y+z) is from 0.01 to 0.8, and at least 50 mol % of the groups $R^3$ are organosilylalkyl.

The present invention is also directed to a silicone composition, comprising:

(A) an organopolysiloxane resin having an average of at least two silicon-bonded alkenyl groups per molecule, wherein the resin has the formula:

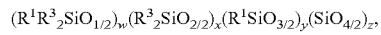

$(R^1R^2{}_2SiO_{1/2})_w(R^2{}_2SiO_{2/2})_x(R^1SiO_{3/2})_y(SiO_{4/2})_z$, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.8, x is from 0 to 0.6, y is from 0 to 0.99, z is from 0 to 0.35, w+x+y+z=1, y+z/(w+x+y+z) is from 0.2 to 0.99, w+x/(w+x+y+z) is from 0.01 to 0.8, and at least 50 mol % of the groups $R^2$ are alkenyl;

(B) an organosilicon compound having an average of at least two silicon-bonded hydrogen atoms per molecule in an amount sufficient to cure the composition, wherein the organosilicon compound comprises at least 0.5% (w/w) of an organohydrogenpolysiloxane resin having the formula $(R^1R^3{}_2SiO_{1/2})_w(R^3{}_2SiO_{2/2})_x(R^1SiO_{3/2})_y(SiO_{4/2})_z$, wherein $R^1$ is $C_1$ to $C_{10}$ hydrocarbyl or $C_1$ to $C_{10}$ halogen-substituted hydrocarbyl, both free of aliphatic unsaturation, $R^3$ is $R^1$ or an organosilylalkyl group having at least one silicon-bonded hydrogen atom, w is from 0 to 0.8, x is from 0 to 0.6, y is from 0 to 0.99, z is from 0 to 0.35, w+x+y+z=1, y+z/(w+x+y+z) is from 0.2 to 0.99, w+x/(w+x+y+z) is from 0.01 to 0.8, and at least 50 mol % of the groups $R^3$ are organosilylalkyl; and (C) a catalytic amount of a hydrosilylation catalyst.

The present invention is further directed to a cured silicone resin prepared by curing the aforementioned silicone composition.

The silicone composition of the present invention has numerous advantages, including low VOC (volatile organic compound) content and adjustable cure. Also, the viscosity of the silicone composition can be varied over a wide range, depending on the requirements of a particular application. Importantly, the silicone composition typically has a higher viscosity than a similar composition containing a non-resinous organosilicon hydride in place of the organohydrogenpolysiloxane resin of this invention.

The silicone composition of the present invention, which does not require an organic solvent for many applications, has a very low VOC content. Consequently, the silicone composition avoids the health, safety, and environmental hazards associated with solvent-borne compositions. In addition, the solventless composition of the present invention typically undergoes less shrinkage during curing than solvent-borne silicone compositions.

Further, when the organosilicon compound, component (B), of the silicone composition comprises 100% (w/w) of the organohydrogenpolysiloxane resin, the composition has particularly low volatility. As a result, the ratio of silicon-bonded hydrogen atoms to alkenyl groups in the composition remains stable during storage and application to a substrate.

Additionally, the silicone composition of the present invention cures rapidly at temperatures from room temperature to moderately elevated temperatures without the formation of detectable byproducts to produce a cured silicone resin having high fracture toughness. In fact, the cure rate of the silicone composition can be conveniently adjusted by regulating the concentration of catalyst and/or optional inhibitor.

The silicone composition of the instant invention has numerous uses, particularly in the electronics field. For example, the silicone composition can be used to attach a die to a printed circuit board, encapsulate an electronic device, fill the gap between a heat sink and an electronic device, attach a heat sink to an electronic device, or encapsulate the wire windings in a power transformer or converter. In particular, the silicone composition is useful for bonding electronic components to flexible or rigid substrates.

DETAILED DESCRIPTION OF THE INVENTION

Figure 1:
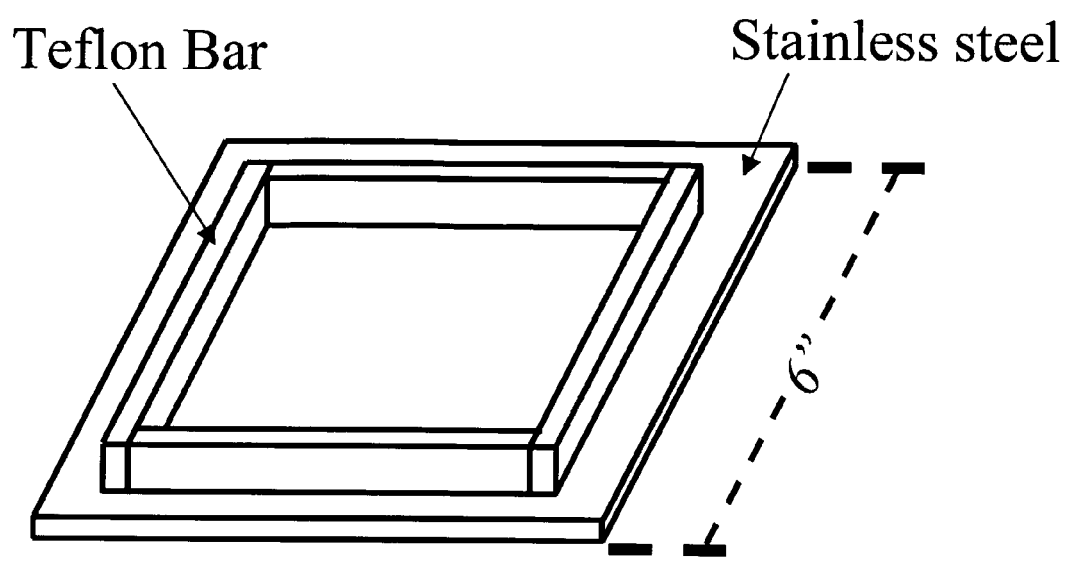
FIG. 1 shows a mold for preparing test specimens for measurement of plane-strain fracture toughness and critical strain energy release rate.

As used herein, the term "hydrocarbyl free of aliphatic unsaturation" means the hydrocarbyl group does not contain an aliphatic carbon-carbon double bond or carbon-carbon triple bond. Also, the term "mol % of the groups $R^3$ are organosilylalkyl" is defined as the ratio of the number of moles of silicon-bonded organosilylalkyl groups to the total number of moles of the groups $R^3$ in the organohydrogenpolysiloxane resin, multiplied by 100. Further, the term "mol % of the groups $R^2$ are alkenyl" is defined as the ratio of the number of moles of silicon-bonded alkenyl groups to the total number of moles of the groups $R^2$ in the organopolysiloxane resin, multiplied by 100.

An organohydrogenpolysiloxane resin according to the present invention has the formula:

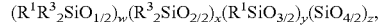

$(R^1R^3{}_2SiO_{1/2})_w(R^3{}_2SiO_{2/2})_x(R^1SiO_{3/2})_y(SiO_{4/2})_z$, wherein $R^1$ is $C_1$ to $C_{10}$ hydrocarbyl or $C_1$ to $C_{10}$ halogen-substituted hydrocarbyl, both free of aliphatic unsaturation, $R^3$ is $R^1$ or an organosilylalkyl group having at least one silicon-bonded hydrogen atom, w is from 0 to 0.8, x is from 0 to 0.6, y is from 0 to 0.99, z is from 0 to 0.35, w+x+y+z=1, y+z/(w+x+y+z) is from 0.2 to 0.99, w+x/(w+x+y+z) is from 0.01 to 0.8, and at least 50 mol % of the groups $R^3$ are organosilylalkyl.

The hydrocarbyl and halogen-substituted hydrocarbyl groups represented by $R^1$ are free of aliphatic unsaturation and typically have from 1 to 10 carbon atoms, alternatively from 1 to 6 carbon atoms. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; and aralkyl, such as benzyl and phenethyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

Examples of organosilylalkyl groups represented by $R^3$ include, but are not limited to, groups having the following formulae:

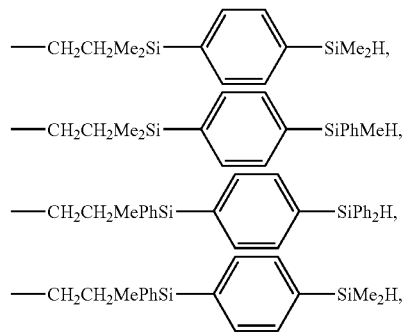

—$CH_2CH_2SiMe_2H$,

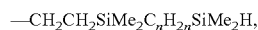
—$CH_2CH_2SiMe_2C_nH_{2n}SiMe_2H$,

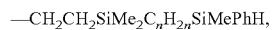
—$CH_2CH_2SiMe_2C_nH_{2n}SiMePhH$,

—$CH_2CH_2SiMePhH$,

—$CH_2CH_2SiPh_2H$,

—$CH_2CH_2SiMePhC_nH_{2n}SiPh_2H$,

—$CH_2CH_2SiMePhC_nH_{2n}SiMe_2H$,

—CH$_2$CH$_2$SiMePhOSiMePhH, and

—CH$_2$CH$_2$SiMePhOSiPh(OSiMePhH)$_2$, where Me is methyl, Ph is phenyl, and the subscript n has a value of from 2 to 10.

In the formula of the organohydrogenpolysiloxane resin, the subscripts w, x, y, and z are mole fractions. The subscript w typically has a value of from 0 to 0.8, alternatively from 0.02 to 0.75, alternatively from 0.05 to 0.3; the subscript x typically has a value of from 0 to 0.6, alternatively from 0 to 0.45, alternatively from 0 to 0.25; the subscript y typically has a value of from 0 to 0.99, alternatively from 0.25 to 0.8, alternatively from 0.5 to 0.8; the subscript z typically has a value of from 0 to 0.35, alternatively from 0 to 0.25, alternatively from 0 to 0.15. Also, the ratio y+z/(w+x+y+z) is typically from 0.2 to 0.99, alternatively from 0.5 to 0.95, alternatively from 0.65 to 0.9. Further, the ratio w+x/(w+x+y+z) is typically from 0.01 to 0.80, alternatively from 0.05 to 0.5, alternatively from 0.1 to 0.35.

Typically, at least 50 mol %, alternatively at least 65 mol %, alternatively at least 80 mol % of the groups R$^3$ in the organohydrogenpolysiloxane resin are organosilylalkyl.

The organohydrogenpolysiloxane resin typically has a number-average molecular weight (M$_n$) of from 500 to 50,000, alternatively from 500 to 10,000, alternatively 1,000 to 3,000, where the molecular weight is determined by gel permeation chromatography employing a low angle laser light scattering detector.

The organohydrogenpolysiloxane resin typically contains less than 10% (w/w), alternatively less than 5% (w/w), alternatively less than 2% (w/w), of silicon-bonded hydroxy groups, as determined by $^{29}$Si NMR.

The organohydrogenpolysiloxane resin contains R$^1$SiO$_{3/2}$ units (i.e., T units) and/or SiO$_{4/2}$ units (i.e., Q units) in combination with R$^1$R$^3{}_2$SiO$_{1/2}$ units (i.e., M units) and/or R$^3{}_2$SiO$_{2/2}$ units (i.e., D units), where R$^1$ and R$^3$ are as defined and exemplified above. For example, the organohydrogenpolysiloxane resin can be a DT resin, an MT resin, an MDT resin, a DTQ resin, and MTQ resin, and MDTQ resin, a DQ resin, an MQ resin, a DTQ resin, an MTQ resin, or an MDQ resin.

Examples of organohydrogenpolysiloxane resins include, but are not limited to, resins having the following formulae:

((HMe$_2$SiC$_6$H$_4$SiMe$_2$CH$_2$CH$_2$)$_2$MeSiO$_{1/2}$)$_{0.12}$(PhSiO$_{3/2}$)$_{0.88}$, ((HMe$_2$SiC$_6$H$_4$SiMe$_2$CH$_2$CH$_2$)$_2$MeSiO$_{1/2}$)$_{0.17}$(PhSiO$_{3/2}$)$_{0.83}$, ((HMe$_2$SiC$_6$H$_4$SiMe$_2$CH$_2$CH$_2$)$_2$MeSiO$_{1/2}$)$_{0.17}$(MeSiO$_{3/2}$)$_{0.17}$(PhSiO$_{3/2}$)$_{0.66}$, ((HMe$_2$SiC$_6$H$_4$SiMe$_2$CH$_2$CH$_2$)$_2$MeSiO$_{1/2}$)$_{0.15}$(PhSiO$_{3/2}$)$_{0.75}$(SiO$_{4/2}$)$_{0.10}$, and ((HMe$_2$SiC$_6$H$_4$SiMe$_2$CH$_2$CH$_2$)$_2$MeSiO$_{1/2}$)$_{0.08}$((HMe$_2$SiC$_6$H$_4$SiMe$_2$CH$_2$CH$_2$)Me$_2$SiO$_{1/2}$)$_{0.06}$(PhSiO$_{3/2}$)$_{0.86}$, where Me is methyl, Ph is phenyl, C$_6$H$_4$ denotes a paraphenylene group, and the numerical subscripts outside the parenthesis denote mole fractions. Also, in the preceding formulae, the sequence of units is unspecified.

The organohydrogenpolysiloxane resin can be prepared by reacting (a) an organopolysiloxane resin having the formula (R$^1$R$^2{}_2$SiO$_{1/2}$)$_w$(R$^2{}_2$SiO$_{2/2}$)$_x$(R$^1$SiO$_{3/2}$)$_y$(SiO$_{4/2}$)$_z$ with (b) an organosilicon compound having an average of from two to four silicon-bonded hydrogen atoms per molecule and a molecular weight less than 1,000, in the presence of (c) a hydrosilylation catalyst and, optionally, (d) an organic solvent, wherein R$^1$ is C$_1$ to C$_{10}$ hydrocarbyl or C$_1$ to C$_{10}$ halogen-substituted hydrocarbyl, both free of aliphatic unsaturation, R$^2$ is R$^1$ or alkenyl, w is from 0 to 0.8, x is from 0 to 0.6, y is from 0 to 0.99, z is from 0 to 0.35, w+x+y+z=1, y+z/(w+x+y+z) is from 0.2 to 0.99, w+x/(w+x+y+z) is from 0.01 to 0.8, at least 50 mol % of the groups R$^2$ are alkenyl, and the mole ratio of silicon-bonded hydrogen atoms in (b) to alkenyl groups in (a) is from 1.5 to 5.

Organopolysiloxane resin (a) has the formula (R$^1$R$^2{}_2$SiO$_{1/2}$)$_w$(R$^2{}_2$SiO$_{2/2}$)$_x$(R$^1$SiO$_{3/2}$)$_y$(SiO$_{4/2}$)$_z$, wherein R$^1$, w, x, y, and z are as described and exemplified above for the organohydrogenpolysiloxane resin of the present invention, and R$^2$ is R$^1$ or alkenyl.

The alkenyl groups represented by R$^2$, which may be the same or different, typically have from 2 to about 10 carbon atoms, alternatively from 2 to 6 carbon atoms, and are exemplified by, but not limited to, vinyl, allyl, butenyl, hexenyl, and octenyl.

Typically at least 50 mol %, alternatively at least 65 mol %, alternatively at least 80 mol % of the groups R$^2$ in organopolysiloxane resin (a) are alkenyl.

Organopolysiloxane resin (a) typically has a number-average molecular weight (M$_n$) of from 500 to 50,000, alternatively from 500 to 10,000, alternatively 1,000 to 3,000, where the molecular weight is determined by gel permeation chromatography employing a low angle laser light scattering detector.

The viscosity of organopolysiloxane (a) at 25° C. is typically from 0.01 to 100,000 Pa·s, alternatively from 0.1 to 10,000 Pa·s, alternatively from 1 to 100 Pa·s.

Organopolysiloxane resin (a) typically contains less than 10% (w/w), alternatively less than 5% (w/w), alternatively less than 2% (w/w), of silicon-bonded hydroxy groups, as determined by $^{29}$Si NMR.

Organopolysiloxane resin (a) contains R$^1$SiO$_{3/2}$ units (i.e., T units) and/or SiO$_{4/2}$ units (i.e., Q units) in combination with R$^1$R$^2{}_2$SiO$_{1/2}$ units (i.e., M units) and/or R$^2{}_2$SiO$_{2/2}$ units (i.e., D units), wherein R$^1$ and R$^2$ are as defined and exemplified above. For example, the organopolysiloxane resin can be a DT resin, an MT resin, an MDT resin, a DTQ resin, and MTQ resin, and MDTQ resin, a DQ resin, an MQ resin, a DTQ resin, an MTQ resin, or an MDQ resin.

Examples of organopolysiloxane resins suitable for use as organopolysiloxane resin (a) include, but are not limited to, resins having the following formulae:

(Vi$_2$MeSiO$_{1/2}$)$_{0.25}$(PhSiO$_{3/2}$)$_{0.75}$, (ViMe$_2$SiO$_{1/2}$)$_{0.25}$(PhSiO$_{3/2}$)$_{0.75}$, (ViMe$_2$SiO$_{1/2}$)$_{0.25}$(MeSiO$_{3/2}$)$_{0.25}$(PhSiO$_{3/2}$)$_{0.50}$, (ViMe$_2$SiO$_{1/2}$)$_{0.15}$(PhSiO$_{3/2}$)$_{0.75}$ (SiO$_{4/2}$)$_{0.1}$, and (Vi$_2$MeSiO$_{1/2}$)$_{0.15}$(ViMe$_2$SiO$_{1/2}$)$_{0.1}$(PhSiO$_{3/2}$)$_{0.75}$, where Me is methyl, Vi is vinyl, Ph is phenyl, and the numerical subscripts outside the parenthesis denote mole fractions.

Methods of preparing organopolysiloxane resins are well known in the art; many of these resins are commercially available. Organopolysiloxane resins are typically prepared by cohydrolyzing the appropriate mixture of chlorosilane precursors in an organic solvent, such as toluene. For example, an organopolysiloxane resin consisting essentially of R$^1$R$^2{}_2$SiO$_{1/2}$ units and R$^1$SiO$_{3/2}$ units can be prepared by cohydrolyzing a compound having the formula R$^1$R$^2{}_2$SiCl and a compound having the formula R$^1$SiCl$_3$ in toluene, where R$^1$ and R$^2$ are as defined and exemplified above. The aqueous hydrochloric acid and silicone hydrolyzate are separated and the hydrolyzate is washed with water to remove residual acid and heated in the presence of a mild condensation catalyst to "body" the resin to the requisite viscosity. If desired, the resin can be further treated with a condensation catalyst in an organic solvent to reduce the content of silicon-bonded hydroxy groups. Alternatively, silanes containing hydrolysable groups other than chloro, such —Br, —I, —OCH$_3$, —OC(O)CH$_3$, —N(CH$_3$)$_2$, NHCOCH$_3$, and —SCH$_3$, can be utilized as starting materials in the cohydrolysis reaction. The properties of the resin products depend on the types of silanes, the mole ratio of silanes, the degree of condensation, and the processing conditions.

Organosilicon compound (b) is at least one organosilicon compound having an average of from two to four silicon-bonded hydrogen atoms per molecule. Alternatively, the organosilicon compound has an average of from two to three silicon-bonded hydrogen atoms per molecule. The organosilicon compound typically has a molecular weight less than 1,000, alternatively less than 750, alternatively less than 500. The silicon-bonded organic groups in the organosilicon compound are selected from hydrocarbyl and halogen-substituted hydrocarbyl groups, both free of aliphatic unsaturation, which are as described and exemplified above for R$^1$ in the formula of the organohydrogenpolysiloxane resin.

Organosilicon compound (b) can be an organohydrogensilane or an organohydrogensiloxane. The organohydrogensilane can be a monosilane, disilane, trisilane, or polysilane. Similarly, the organohydrogensiloxane can be a disiloxane, trisiloxane, or polysiloxane. The structure of the organosilicon compound can be linear, branched, or cyclic. Cyclosiloxanes typically have from 3 to 12 silicon atoms, alternatively from 3 to 10 silicon atoms, alternatively from 3 to 4 silicon atoms. In polysilanes and polsiloxanes, the silicon-bonded hydrogen atoms can be located at terminal, pendant, or at both terminal and pendant positions.

Examples of organohydrogensilanes include, but are not limited to, diphenylsilane, 2-chloroethylsilane, bis[(p-dimethylsilyl)phenyl]ether, 1,4-dimethyldisilylethane, 1,3,5-tris(dimethylsilyl)benzene, and 1,3,5-trimethyl-1,3,5-trisilane.

The organohydrogensilane can also be a organohydrogensilane having the formula:

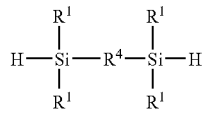

wherein R$^1$ is C$_1$ to C$_{10}$ hydrocarbyl or C$_1$ to C$_{10}$ halogen-substituted hydrocarbyl, both free of aliphatic unsaturation, and R$^4$ is a hydrocarbylene group having a formula selected from:

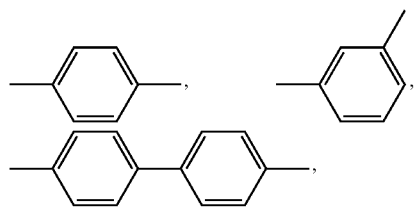

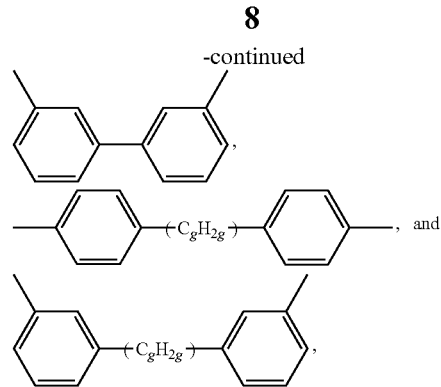

wherein g is from 1 to 6. The hydrocarbyl and halogen-substituted hydrocarbyl groups represented by R$^1$ are as defined and exemplified above for the organohydrogenpolysiloxane resin of this invention.

Examples of organohydrogensilanes include, but are not limited to, compounds having the following formulae:

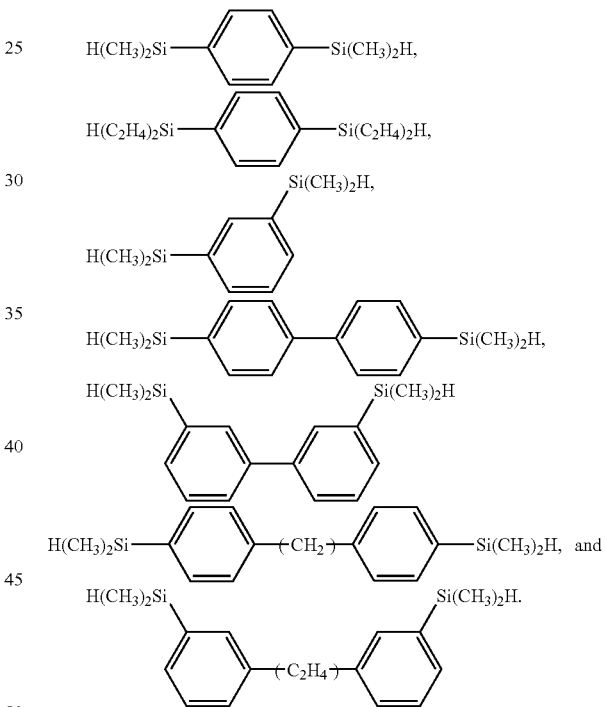

Methods of preparing organohydrogensilanes, such as the reaction of Grignard reagents with alkyl or aryl halides, are well known in the art. For example, organohydrogensilanes having the formula HR$^1$$_2$Si—R$^4$—SiR$^1$$_2$H can be prepared by treating an aryl dihalide having the formula R$^4$X$_2$ with magnesium in ether to produce the corresponding Grignard reagent and then treating the Grignard reagent with a chlorosilane having the formula HR$^1$$_2$SiCl, where R$^1$ and R$^4$ are as defined and exemplified above.

Examples of organohydrogensiloxanes include, but are not limited to, 1,1,3,3-tetramethyldisiloxane, 1,1,3,3-tetraphenyldisiloxane, phenyltris(dimethylsiloxy)silane, and 1,3,5-trimethylcyclotrisiloxane.

Methods of preparing organohydrogensiloxanes, such as the hydrolysis and condensation of organohalosilanes, are well known in the art.

Organopolysiloxane (b) can be a single organosilicon compound or a mixture comprising two or more different organosilicon compounds, each as described above. For example, the organosilicon compound can be a single organohydrogensilane, a mixture of two different organohydrogensilanes, a single organohydrogensiloxane, a mixture of two different organohydrogensiloxanes, or a mixture of an organohydrogensilane and an organohydrogensiloxane.

Hydrosilylation catalyst (c) can be any of the well-known hydrosilylation catalysts comprising a platinum group metal (i.e., platinum, rhodium, ruthenium, palladium, osmium and iridium) or a compound containing a platinum group metal. Preferably, the platinum group metal is platinum, based on its high activity in hydrosilylation reactions.

Hydrosilylation catalysts include the complexes of chloroplatinic acid and certain vinyl-containing organosiloxanes disclosed by Willing in U.S. Pat. No. 3,419,593, which is hereby incorporated by reference. A catalyst of this type is the reaction product of chloroplatinic acid and 1,3-diethenyl-1,1,3,3-tetramethyldisiloxane.

In one embodiment of the present method, the hydrosilylation catalyst is a supported catalyst comprising a solid support having a platinum group metal on the surface thereof. Supported catalysts can be conveniently separated from the organohydrogenpolysiloxane product, for example, by filtering the reaction mixture. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

Organic solvent (d) is at least one organic solvent. The organic solvent can be any aprotic or dipolar aprotic organic solvent that does not react with organopolysiloxane (a), organosilicon compound (b), or the organohydrogenpolysiloxane under the conditions of the present method, and is miscible with components (a), (b), and the organohydrogenpolysiloxane resin.

Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. Organic solvent (d) can be a single organic solvent or a mixture comprising two or more different organic solvents, each as defined above.

The reaction can be carried out in any standard reactor suitable for hydrosilylation reactions. Suitable reactors include glass and Teflon-lined glass reactors. Preferably, the reactor is equipped with a means of agitation, such as stirring. Also, preferably, the reaction is carried out in an inert atmosphere, such as nitrogen or argon, in the absence of moisture.

The organopolysiloxane, organosilicon compound, hydrosilylation catalyst, and, optionally, organic solvent, can be combined in any order. Typically, organopolysiloxane (a), organosilicon compound (b) and, optionally, organic solvent (d) are combined before the introduction of hydrosilylation catalyst (c).

The reaction is typically carried out at a temperature of from 0 to 150° C., alternatively from room temperature (~23° C.) to 115° C. When the temperature is less than 0° C., the rate of reaction is typically very slow.

The reaction time depends on several factors, such as the structures of the organopolysiloxane resin and the organosilicon compound, and the temperature. The time of reaction is typically from 1 to 24 h at a temperature of from room temperature to 150° C. The optimum reaction time can be determined by routine experimentation using the methods set forth in the Examples section below.

The mole ratio of silicon-bonded hydrogen atoms in organosilicon compound (b) to alkenyl groups in organopolysiloxane resin (a) is typically from 1.5 to 5, alternatively from 1.75 to 3, alternatively from 2 to 2.5.

The concentration of hydrosilylation catalyst (c) is sufficient to catalyze the addition reaction of organopolysiloxane resin (a) with organosilicon compound (b). Typically, the concentration of hydrosilylation catalyst (c) is sufficient to provide from 0.1 to 1000 ppm of a platinum group metal, alternatively from 1 to 500 ppm of a platinum group metal, alternatively from 5 to 150 ppm of a platinum group metal, based on the combined weight of organopolysiloxane resin (a) and organosilicon compound (b). The rate of reaction is very slow below 0.1 ppm of platinum group metal. The use of more than 1000 ppm of platinum group metal results in no appreciable increase in reaction rate, and is therefore uneconomical.

The concentration of organic solvent (d) is typically from 0 to 99% (w/w), alternatively from 30 to 80% (w/w), alternatively from 45 to 60% (w/w), based on the total weight of the reaction mixture.

The organohydrogenpolysiloxane resin can be used without isolation or purification in the silicone composition, described below, or the resin can be separated from most of the solvent by conventional methods of evaporation. For example, the reaction mixture can be heated under reduced pressure. Moreover, when the hydrosilylation catalyst used to prepare the organohydrogenpolysiloxane resin is a supported catalyst, described above, the resin can be readily separated from the hydrosilylation catalyst by filtering the reaction mixture. However, when the organohydrogenpolysiloxane resin is not separated from the hydrosilylation catalyst used to prepare the resin, the catalyst may be used as component (C) of the silicone composition.

A silicone composition according to the present invention comprises:

(A) an organopolysiloxane resin having an average of at least two silicon-bonded alkenyl groups per molecule, wherein the resin has the formula:

$$(R^1R^2_2SiO_{1/2})_w(R^2_2SiO_{2/2})_x(R^1SiO_{3/2})_y(SiO_{4/2})_z,$$

wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.8, x is from 0 to 0.6, y is from 0 to 0.99, z is from 0 to 0.35, w+x+y+z=1, y+z/(w+x+y+z) is from 0.2 to 0.99, w+x/(w+x+y+z) is from 0.01 to 0.8, and at least 50 mol % of the groups $R^2$ are alkenyl;

(B) an organosilicon compound having an average of at least two silicon-bonded hydrogen atoms per molecule in an amount sufficient to cure the composition, wherein the organosilicon compound comprises at least 0.5% of an organohydrogenpolysiloxane resin having the formula $(R^1R^3_2SiO_{1/2})_w(R^3_2SiO_{2/2})_x(R^1SiO_{3/2})_y(SiO_{4/2})_z$, 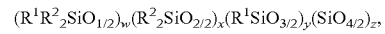 wherein $R^1$ is $C_1$ to $C_{10}$ hydrocarbyl or $C_1$ to $C_{10}$ halogen-substituted hydrocarbyl, both free of aliphatic unsaturation, $R^3$ is $R^1$ or an organosilylalkyl group having at least one silicon-bonded hydrogen atom, w is from 0 to 0.8, x is from 0 to 0.6, y is from 0 to 0.99, z is from 0 to 0.35, w+x+y+z=1, y+z/(w+x+y+z) is from 0.2 to 0.99, w+x/(w+x+y+z) is from 0.01 to 0.8, and at least 50 mol % of the groups $R^3$ are organosilylalkyl; and (C) a catalytic amount of a hydrosilylation catalyst.

Component (A) is at least one organopolysiloxane resin, wherein the resin is as described and exemplified above for organopolysiloxane resin (a) in the method of preparing the organohydrogenpolysiloxane of this invention. Component (A) can be the same organopolysiloxane resin used to prepare the organohydrogenpolysiloxane resin of component (B), described below, or a different resin.

Component (A) can be a single organopolysiloxane resin or a mixture comprising two or more different organopolysiloxane resins that differ in at least one of the following properties: structure, viscosity, average molecular weight, siloxane units, and sequence.

Component (B) is at least one organosilicon compound having an average of at least two silicon-bonded hydrogen atoms per molecule in an amount sufficient to cure the composition, wherein the organosilicon compound comprises at least 0.5% (w/w) of the organohydrogenpolysiloxane resin of the present invention, described and exemplified above.

Component (B) typically comprises at least 0.5% (w/w), alternatively at least 50% (w/w), alternatively at least 75% (w/w), based on the total weight of component (B), of the organohydrogenpolysiloxane resin of the present invention, described and exemplified above. In one embodiment of the silicone composition, component (B) is the organohydrogenpolysiloxane resin of this invention (i.e., component (B) comprises 100% (w/w) of the organohydrogenpolysiloxane resin).

The organosilicon compound contains an average of at least two silicon-bonded hydrogen atoms per molecule, alternatively at least three silicon-bonded hydrogen atoms per molecule. It is generally understood that crosslinking occurs when the sum of the average number of alkenyl groups per molecule in component (A) and the average number of silicon-bonded hydrogen atoms per molecule in component (B) is greater than four.

Organosilicon compounds other than the organohydrogenpolysiloxane resin of the present invention are typically organohydrogensilanes and organohydrogensiloxanes. The organohydrogensilane can be a monosilane, disilane, trisilane, or polysilane. Similarly, the organohydrogensiloxane can be a disiloxane, trisiloxane, or polysiloxane. The structure of the organosilicon compound can be linear, branched, or cyclic. Cyclosiloxanes typically have from 3 to 12 silicon atoms, alternatively from 3 to 10 silicon atoms, alternatively from 3 to 4 silicon atoms. In polysilanes and polsiloxanes, the silicon-bonded hydrogen atoms can be located at terminal, pendant, or at both terminal and pendant positions.

Examples of organohydrogensilanes include, but are not limited to, diphenylsilane, 2-chloroethylsilane, bis[(p-dimethylsilyl)phenyl]ether, 1,4-dimethyldisilylethane, 1,3,5-tris(dimethylsilyl)benzene, 1,3,5-trimethyl-1,3,5-trisilane, poly(methylsilylene)phenylene, and poly(methylsilylene)methylene. The organohydrogensilane can also have the formula $HR^1_2Si\text{—}R^4\text{—}SiR^1_2H$, wherein $R^1$ and $R^4$ are as described and exemplified above for organosilicon compound (b) in the method of preparing the organohydrogenpolysiloxane of the instant invention.

Examples of organohydrogensiloxanes include, but are not limited to, 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), a dimethylhydrogensiloxy-terminated poly(methylhydrogensiloxane), and a resin consisting essentially of $HMe_2SiO_{1/2}$ units, $Me_3SiO_{1/2}$ units, and $SiO_{4/2}$ units, wherein Me is methyl.

Component (B) can be a single organosilicon compound or a mixture comprising two or more different organosilicon compounds, each as described above. For example component (B) can a single organohydrogenpolysiloxane resin of this invention, a mixture of two such resins, or a mixture of the organohydrogenpolysiloxane resin and an organohydrogenosilane and/or organohydrogensiloxane.

The concentration of component (B) is sufficient to cure (crosslink) the composition. The exact amount of component (B) depends on the desired extent of cure, which generally increases as the ratio of the number of moles of silicon-bonded hydrogen atoms in component (B) to the number of moles of alkenyl groups in component (A) increases. The concentration of component (B) is sufficient to provide from 0.5 to 2 moles of silicon-bonded hydrogen atoms, alternatively from 0.8 to 1.8 moles of silicon-bonded hydrogen atoms, alternatively from 1.0 to 1.2 moles of silicon-bonded hydrogen atoms, per mole of alkenyl groups in component (A).

Methods of preparing organosilicon compounds containing silicon-bonded hydrogen atoms are well known in the art. For example, organohydrogenpolysilanes can be prepared by reaction of Grignard reagents with alkyl or aryl halides. Methods of preparing organohydrogenpolysiloxanes, such as the hydrolysis and condensation of organohalosilanes, are well known in the art.

Component (C) is at least one hydrosilylation catalyst that promotes the addition reaction of component (A) with component (B). The hydrosilylation catalyst can be any of the well-known hydrosilylation catalysts comprising a platinum group metal, a compound containing a platinum group metal, or a microencapsulated platinum group metal-containing catalyst. Platinum group metals include platinum, rhodium, ruthenium, palladium, osmium and iridium. Preferably, the platinum group metal is platinum, based on its high activity in hydrosilylation reactions.

Preferred hydrosilylation catalysts include the complexes of chloroplatinic acid and certain vinyl-containing organosiloxanes disclosed by Willing in U.S. Pat. No. 3,419,593, which is hereby incorporated by reference. A preferred catalyst of this type is the reaction product of chloroplatinic acid and 1,3-diethenyl-1,1,3,3-tetramethyldisiloxane.

The hydrosilylation catalyst can also be a microencapsulated platinum group metal-containing catalyst comprising a platinum group metal encapsulated in a thermoplastic resin. Compositions containing microencapsulated hydrosilylation catalysts are stable for extended periods of time, typically several months or longer, under ambient conditions, yet cure relatively rapidly at temperatures above the melting or softening point of the thermoplastic resin(s). Microencapsulated hydrosilylation catalysts and methods of preparing them are well known in the art, as exemplified in U.S. Pat. No. 4,766,176 and the references cited therein; and U.S. Pat. No. 5,017,654.

Component (C) can be a single hydrosilylation catalyst or a mixture comprising two or more different catalysts that differ in at least one property, such as structure, form, platinum group metal, complexing ligand, and thermoplastic resin.

The concentration of component (C) is sufficient to catalyze the addition reaction of components (A) with component (B). Typically, the concentration of component (C) is sufficient to provide from 0.1 to 1000 ppm of a platinum group metal, preferably from 1 to 500 ppm of a platinum group metal, and more preferably from 5 to 150 ppm of a platinum group metal, based on the combined weight of components (A) and (B). The rate of cure is very slow below 0.1 ppm of platinum group metal. The use of more than 1000 ppm of platinum group metal results in no appreciable increase in cure rate, and is therefore uneconomical.

The silicone composition can comprise additional ingredients, provided the ingredient does not prevent the composition from curing to form a silicone resin having high fracture toughness, as described above. Examples of additional ingredients include, but are not limited to, hydrosilylation catalyst inhibitors, such as 3-methyl-3-penten-1-yne, 3,5-dimethyl-3-hexen-1-yne, 3,5-dimethyl-1-hexyn-3-ol, 1-ethynyl-1-cyclohexanol, 2-phenyl-3-butyn-2-ol, vinylcyclosiloxanes, and triphenylphosphine; adhesion promoters, such as the adhesion promoters taught in U.S. Pat. Nos. 4,087,585 and 5,194,649; dyes; pigments; anti-oxidants; heat stabilizers; UV stabilizers; flame retardants; flow control additives; organic solvents; and reactive diluents.

For example, the silicone composition can contain (D) a reactive diluent comprising (i) an organosiloxane having an average of at least two silicon-bonded alkenyl groups per molecule and a viscosity of from 0.001 to 2 Pa·s at 25° C., wherein the viscosity of (D)(i) is not greater than 20% of the viscosity of component (A) of the silicone composition and the organosiloxane has the formula $(R^1R^2{}_2SiO_{1/2})_m$ $(R^2{}_2SiO_{2/2})_n(R^1SiO_{3/2})_p(SiO_{4/2})_q$, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, m is 0 to 0.8, n=0 to 1, p=0 to 0.25, q=0 to 0.2, m+n+p+q=1, and m+n is not equal to 0, provided when p+q=0, n is not equal to 0 and the alkenyl groups are not all terminal, and (ii) an organohydrogensiloxane having an average of at least two silicon-bonded hydrogen atoms per molecule and a viscosity of from 0.001 to 2 Pa·s at 25° C., in an amount sufficient to provide from 0.5 to 3 moles of silicon-bonded hydrogen atoms in (D)(ii) per mole of alkenyl groups in (D)(i), wherein the organohydrogensiloxane has the formula $(HR^1{}_2SiO_{1/2})_s$ $(R^1SiO_{3/2})_t(SiO_{4/2})_v$, wherein $R^1$ is $C_1$ to $C_{10}$ hydrocarbyl or $C_1$ to $C_{10}$ halogen-substituted hydrocarbyl, both free of aliphatic unsaturation, s is from 0.25 to 0.8, t is from 0 to 0.5, v is from 0 to 0.3, s+t+v=1, and t+v is not equal to 0.

Component (D)(i) is at least one organosiloxane having an average of at least two alkenyl groups per molecule and a viscosity of from 0.001 to 2 Pa·s at 25° C., wherein the viscosity of (D)(i) is not greater than 20% of the viscosity of component (A) of the silicone composition and the organosiloxane has the formula $(R^1R^2{}_2SiO_{1/2})_m(R^2{}_2SiO_{2/2})_n$ $(R^1SiO_{3/2})_p(SiO_{4/2})_q$, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, m is 0 to 0.8, n=0 to 1, p=0 to 0.25, q=0 to 0.2, m+n+p+q=1, and m+n is not equal to 0, provided when p+q=0, n is not equal to 0 and the alkenyl groups are not all terminal (i.e., not all the alkenyl groups in the organosiloxane are in the $R^1R^2{}_2SiO_{1/2}$ units). Further, organosiloxane (D)(i) can have a linear, branched, or cyclic structure. For example, when the subscripts m, p, and q in the formula of organosiloxane (D)(i) are each equal to 0, the organosiloxane is an organocyclosiloxane.

The viscosity of organosiloxane (D)(i) at 25° C. is typically not greater than 20%, alternatively not greater than 10%, alternatively not greater than 1%, of the viscosity of component (A). For example, the viscosity of organosiloxane (D)(i) at 25° C. is typically from 0.001 to 2 Pa·s, alternatively from 0.001 to 0.1 Pa·s, alternatively from 0.001 to 0.05 Pa·s.

Examples of organosiloxanes suitable for use as organosiloxane (D)(i) include, but are not limited to, organosiloxanes having the following formulae:

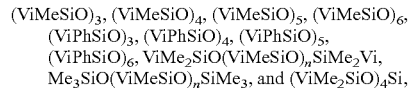

where Me is methyl, Ph is phenyl, Vi is vinyl, and the subscript n has a value such that the organosiloxane has a viscosity of from 0.001 to 2 Pa·s at 25° C.

Component (D)(i) can be a single organosiloxane or a mixture of two or more different organosiloxanes, each as described above. Methods of making alkenyl-functional organosiloxanes are well known in the art.

Component (D)(ii) is at least one organohydrogensiloxane having an average of at least two silicon-bonded hydrogen atoms per molecule and a viscosity of from 0.001 to 2 Pas at 25° C., in an amount sufficient to provide from 0.5 to 3 moles of silicon-bonded hydrogen atoms in (D)(ii) to moles of alkenyl groups in (D)(i), wherein the organohydrogensiloxane has the formula $(HR^1{}_2SiO_{1/2})_s(R^1SiO_{3/2})_t(SiO_{4/2})_v$, wherein $R^1$ is $C_1$ to $C_{10}$ hydrocarbyl or $C_1$ to $C_{10}$ halogen-substituted hydrocarbyl, both free of aliphatic unsaturation, s is from 0.25 to 0.8, t is from 0 to 0.5, v is from 0 to 0.3, s+t+v=1, and t+v is not equal to 0.

The viscosity of organohydrogensiloxane (D)(ii) at 25° C. is typically from 0.001 to 2 Pa·s, alternatively from 0.001 to 0.1 Pa·s, alternatively from 0.001 to 0.05 Pa·s.

Examples of organohydrogensiloxanes suitable for use as organohydrogensiloxane (D)(ii) include, but are not limited to, organohydrogensiloxanes having the following formulae:

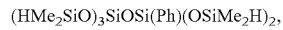

where Me is methyl and Ph is phenyl.

Component (D)(ii) can be a single organohydrogensiloxane or a mixture of two or more different organohydrogensiloxanes, each as described above. Methods of making organohydrogensiloxanes are well known in the art.

The concentration of component (D)(ii) is sufficient to provide from 0.5 to 3 moles of silicon-bonded hydrogen atoms, alternatively from 0.6 to 2 moles of silicon-bonded hydrogen atoms, alternatively from 0.9 to 1.5 moles of silicon-bonded hydrogen atoms, per mole of alkenyl groups in component (D)(i).

The concentration of the reactive diluent (D), component (D)(i) and (D)(ii) combined, in the silicone composition is typically from 0 to 90% (w/w), alternatively from 0 to 50% (w/w), alternatively from 0 to 20% (w/w), alternatively from 0 to 10% (w/w), based on the combined weight of components (A) and (B).

The silicone composition can be a one-part composition comprising components (A) through (C) in a single part or, alternatively, a multi-part composition comprising components (A) through (C) in two or more parts. For example, a multi-part silicone composition can comprise a first part containing a portion of component (A) and all of component (C), and a second part containing the remaining portion of components (A) and all of component (B).

The one-part silicone composition is typically prepared by combining components (A) through (C) and any optional ingredients in the stated proportions at ambient temperature, with or without the aid of an organic solvent. Although the order of addition of the various components is not critical if the silicone composition is to be used immediately, the hydrosilylation catalyst is preferably added last at a temperature below about 30° C. to prevent premature curing of the composition. Also, the multi-part silicone composition can be prepared by combining the particular components designated for each part.

Mixing can be accomplished by any of the techniques known in the art such as milling, blending, and stirring, either in a batch or continuous process. The particular device is determined by the viscosity of the components and the viscosity of the final silicone composition.

The silicone composition can be applied to a wide variety of solid substrates including, but not limited to, metals such as aluminum, gold, silver, tin-lead, nickel, copper, and iron, and their alloys; silicon; fluorocarbon polymers such as polytetrafluoroethylene and polyvinylfluoride; polyamides such as Nylon; polyimides; epoxies; polyesters; polycarbonates; polyphenylene oxides; ceramics; and glass.

A cured silicone resin according to the present invention can be prepared by curing the aforementioned silicone composition. The silicone composition can be cured at a temperature from about room temperature to about 250° C., preferably from about room temperature to about 200° C., and more preferably from about room temperature to about 150° C., for a suitable length of time. For example, the silicone composition typically cures in less than about one hour at 150° C.

The silicone composition of the present invention has numerous advantages, including low VOC (volatile organic compound) content and adjustable cure. Also, the viscosity of the silicone composition can be varied over a wide range, depending on the requirements of a particular application. Importantly, the silicone composition typically has a higher viscosity than a similar composition containing a non-resinous organosilicon hydride in place of the organohydrogenpolysiloxane resin of this invention.

The silicone composition of the present invention, which does not require an organic solvent for many applications, has a very low VOC content. Consequently, the silicone composition avoids the health, safety, and environmental hazards associated with solvent-borne compositions. In addition, the solventless composition of the present invention typically undergoes less shrinkage during curing than solvent-borne silicone compositions.

Further, when the organosilicon compound, component (B), of the silicone composition comprises 100% (w/w) of the organohydrogenpolysiloxane resin, the composition has particularly low volatility. As a result, the ratio of silicon-bonded hydrogen atoms to alkenyl groups in the composition remains stable during storage and application to a substrate.

Additionally, the silicone composition of the present invention cures rapidly at temperatures from room temperature to moderately elevated temperatures without the formation of detectable byproducts to produce a cured silicone resin having high fracture toughness. In fact, the cure rate of the silicone composition can be conveniently adjusted by regulating the concentration of catalyst and/or optional inhibitor.

The silicone composition of the instant invention has numerous uses, particularly in the electronics field. For example, the silicone composition can be used to attach a die to a printed circuit board, encapsulate an electronic device, fill the gap between a heat sink and an electronic device, attach a heat sink to an electronic device, or encapsulate the wire windings in a power transformer or converter. In particular, the silicone composition is useful for bonding electronic components to flexible or rigid substrates.

EXAMPLES

The following examples are presented to better illustrate the organohydrogenpolysiloxane resin and the silicone composition of the present invention, but are not to be considered as limiting the invention, which is delineated in the appended claims. Unless otherwise noted, all parts and percentages reported in the examples are by weight. The following methods and materials were employed in the examples:

Preparation of Test Specimens for Measurement of Flexural Strength and Flexural Modulus The silicone composition was poured into a rectangular mold measuring 5.0×5.0×0.125 in. (12.7×12.7×0.318 cm) and constructed of Teflon bars and a stainless steel plate (FIG. 1). The filled mold was heated in a vacuum oven at 50° C. under a pressure of 50 mm Hg (6,666 Pa) for about ten minutes to degas the composition. After cooling to room temperature, the mold was placed in a forced air oven and subjected to the following heating cycle: 60° C. for 24 hours, 100° C. for 2 hours, 160° C. for 4 hours, and 200° C. for 2 hours. The mold was allowed to cool to room temperature and the cured silicone sample was removed.

The cured silicone sample was cut with a band saw into four identical test specimens, each measuring 2.0×0.5×0.125 in. (5.1×1.3×0.318 cm). The test specimens were polished by hand using, in order, sand papers having grit numbers of 320, 500, 800, 1200, 2400, and 4000. The test specimens were further polished by hand using, in order, aqueous dispersions of alumina having particles sizes of 1, 0.1, and 0.05 μm. The polished specimens were dried at 80° C. overnight and then maintained at room temperature for at least 24 hours before testing.

Measurement of Flexural Strength and Flexural Modulus

The flexural properties of a silicone test specimen were determined using an Instron 8562 Loadframe equipped with a 1000 N loadcell. Measurements were performed at 21° C. using a three-point loading system as described in ASTM D 790-00.

Load-deflection curves were plotted to determine the flexural strength and flexural modulus of the test specimen. The flexural strength was calculated using the following equation:

$$\sigma_{fM} = 3PL/2bd^2$$

where:
$\sigma_{fM}$=flexural strength (maximum stress in the outer surface at the midpoint), MPa,
P=maximum load on the load-deflection curve, N,
L=support span, mm,
b=width of beam tested, mm, and
d=depth of beam tested, mm.

The Flexural modulus, also referred to as "modulus of elasticity," of a silicone test specimen was determined by drawing a tangent to the steepest initial straight-line portion of the load-deflection (stress-strain) curve. The slope of the tangent was taken as the flexural modulus.

Reported values for flexural strength and flexural modulus, expressed in units of MPa and GPa, respectively, represent the average of four measurements performed on identically prepared test specimens.

Preparation of Test Specimens for Measurement of Plane-Strain Fracture Toughness and Critical Strain Energy Release Rate The silicone composition was poured into a rectangular mold measuring 5.0×5.0×0.125 in. (12.7×12.7×0.318 cm) and constructed of Teflon bars and a stainless steel plate (FIG. 1). The filled mold was heated in a vacuum oven at 50° C. under a pressure of 50 mm Hg (6,666 Pa) for about ten minutes to degas the composition. After cooling to room temperature, the mold was placed in a forced air oven and subjected to the following heating cycle: 60° C. for 24 hours, 100° C. for 2 hours, 160° C. for 4 hours, and 200° C. for 2 hours. The mold was allowed to cool to room temperature and the cured silicone sample was removed.

The cured silicone sample was cut with a band saw into six identical test specimens, each measuring 2.0×0.375×0.125 in. (5.1×0.953×0.318 cm). The test specimens were polished by hand using, in order, sand papers having grit numbers of 320, 500, 800, 1200, 2400, and 4000. The test specimens were further polished by hand using, in order, aqueous dispersions of alumina having particles sizes of 1, 0.1, and 0.05 µm. The polished specimens were dried at 80° C. overnight and then maintained at room temperature for at least 24 hours.

Figure 2:
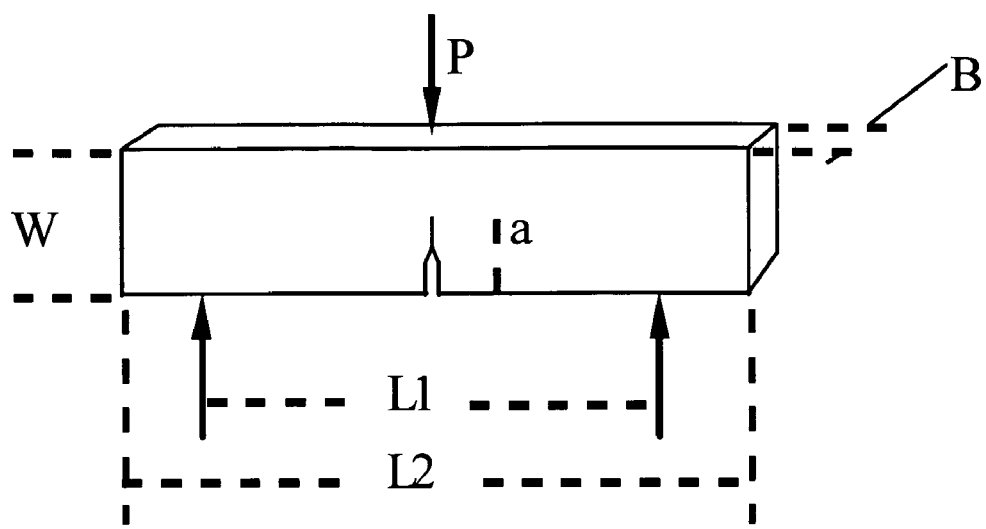
FIG. 2 shows a test specimen for measurement of plane-strain fracture toughness and critical strain energy release rate.

A notch having a depth of 0.1 in. (0.254 cm) was cut in the specimen at the midpoint of each specimen by machining. Subsequently, a natural crack extending from the root of the notch to about half of the specimen width was generated by inserting a fresh razor blade in the notch and gently tapping on the blade. The configuration of the final test specimen is shown in FIG. 2, where P represents the maximum load that the specimen is able to sustain, a represents crack length, W represents a specimen width of 0.375 in. (0.953 cm), B represents specimen thickness of 0.157 in. (0.399 cm), L1 represents a support span of 1.5 in. (3.81 cm), and L2 represents a specimen length of 2.0 in. (5.08 cm).

Measurement of Plane-Strain Fracture Toughness and Critical Strain Energy Release Rate The plane-strain fracture toughness, $K_{IC}$, and critical strain energy release rate, $G_{IC}$, of a silicone test specimen was determined using an Instron 8562 Loadframe equipped with a 1000 N loadcell. Measurements were performed at 21° C. using a three-point bending system as described in ASTM D 5045-99. The displacement rate of the test was 10 mm/minute. For the geometry and loading conditions shown in FIG. 2 and a support span to specimen width ratio (L1/W) equal to 4, fracture toughness was calculated using the following equation:

$$K_{IC}=(P/BM^{1/2})f(x)$$

where:
$K_{IC}$=fracture toughness, $mPam^{1/2}$,
P=maximum load, kN,
B=is specimen thickness, cm,
W=specimen width, cm,
$f(x)=6x^{1/2}(1.99-x(1-x)(2.15-3.93x+2.7x^2))/((1+2x)(1-x)^{3/2})$, and
x=a/W where a is crack length in cm.

The crack length, a, was selected such that 0.45<a/W<0.55.

The critical strain energy release rate was determined according to the following:

$$G_{IC}=K_{IC}^2/E(1-v^2)$$

where:
$G_{IC}$=critical strain energy release rate, N/m,
E=Flexural modulus, GPa, and
v=Poisson's ratio, which is assumed to have a value of zero.

Preparation of Test Specimens for Measurement of Glass Transition and Onset Temperature The silicone composition was poured into a rectangular mold measuring 5.0×5.0×0.125 in. (12.7×12.7×0.318 cm) and constructed of Teflon bars and a stainless steel plate (FIG. 1). The filled mold was heated in a vacuum oven at 50° C. under a pressure of 50 mm Hg (6,666 Pa) for about ten minutes to degas the composition. After cooling to room temperature, the mold was placed in a forced air oven and subjected to the following heating cycle: 60° C. for 24 hours, 100° C. for 2 hours, 160° C. for 4 hours, and 200° C. for 2 hours. The mold was allowed to cool to room temperature and the cured silicone sample was removed.

The cured silicone sample was cut with a slow speed diamond saw into six identical test specimens, each measuring 1×3×20 mm.

Measurement of Glass Transition Temperature and Onset Temperature

The Tg of a silicone test specimen was determined using a TA Instruments 2980 Dynamic Mechanical Analyzer (DMA). The test specimen was mounted in a tension mode and equilibrated at −150° C. At a test frequency of 1 Hz, the temperature of the specimen was increased at a rate of 4° C./step to 400° C. The test specimen was subjected to a sinusoidal strain and the tensile force as a function of input strain and temperature was measured, from which the storage modulus and the loss modulus were obtained. The ratio of the loss modulus to the storage modulus, tan δ, was calculated. The $T_g$ of the specimen was taken as the temperature (° C.) corresponding to the maximum value of tan δ in the plot of tan δ versus temperature. Alternatively, the onset temperature, $T_O$, of the glass transition was taken as the temperature at which the storage modulus started to drop in the plot of storage modulus versus temperature.

Measurement of Viscosity

The viscosities of the silicone compositions of Examples 6-8 were determined using a Carri-Med CSL500 parallel-plate rheometer equipped with 25-mm plates having a gap width of 1 mm. The rheometer was operated in a controlled-stress mode at a temperature of 25° C. The reported value of viscosity, expressed in Pa·s, was measured at a shear rate of 1 $s^{-1}$. The viscosity of the silicone compositions of Example 5 and Comparative Example were determined using a Brookfield rotating disc viscometer equipped with a thermal cell and an SC4-31 spindle. The instrument was operated at a constant temperature of 25° C. and a rotational speed of 5 rpm.

Platinum Catalyst is a hydrosilylation catalyst containing 1000 ppm of platinum in toluene. The catalyst was prepared by treating a platinum(0) complex of 1,1,3,3-tetramethyldisiloxane in the presence of a large molar excess of 1,1,3,3-tetramethyldisiloxane, with triphenylphosphine to achieve a mole ratio of triphenylphosphine to platinum of about 4:1.

Example 1

This example demonstrates the preparation of the organopolysiloxane resin used in Examples 4-8 and Comparative Example 1. Trimethoxyphenylsilane (200 g), tetramethyldivinyldisiloxane (38.7 g), deionized water (65.5 g), toluene (256 g), and trifluoromethanesulfonic acid (1.7 g) were combined in a 3-neck, round-bottom flask equipped with a Dean-Stark Trap and thermometer. The mixture was heated at 60 to 65° C. for 2 hours. The mixture was then heated to reflux and water and methanol were removed using a Dean-Stark trap. When the temperature of the mixture reached 80° C. and the removal of water and methanol was complete, the mixture was cooled to less than 50° C. Calcium carbonate (3.3 g) and water (about 1 g) were added to the mixture. The mixture was stirred at room temperature for 2 hours and then potassium hydroxide (0.17 g) was added to the mixture. The mixture was then heated to reflux and water was removed using a Dean-Stark trap. When the reaction temperature reached 120° C. and the removal of water was complete, the mixture was cooled to less than 40° C. Chlorodimethylvinylsilane (0.37 g) was added to the mixture and mixing was continued at room temperature for 1 hour. The mixture was filtered to give a solution of an organopolysiloxane resin having the formula $(PhSiO_{3/2})_{0.75}(ViMe_2SiO_{1/2})_{0.25}$ in toluene. The resin has a weight-average molecular weight of about 1700, has a number-average molecular weight of about 1440, and contains about 1 mol % of silicon-bonded hydroxy groups.

The volume of the solution was adjusted to produce a solution containing 79.5 percent by weight of the organopolysiloxane resin in toluene. The resin concentration of a solution was determined by measuring the weight loss after drying a sample (2.0 g) of the solution in an oven at 150° C. for 1.5 hours.

Example 2

This example describes the preparation of 1,4-bis(dimethylsilyl)benzene. Magnesium (84 g) and tetrahydrofuran (406 g) were combined under nitrogen in a 5-L, three-neck flask equipped with a mechanical stirrer, condenser, two addition funnels, and thermometer. 1,2-dibromoethane (10 g) was added to the mixture and the contents of the flask were heated to 50 to 60° C. Tetrahydrofuran (THF, 200 mL) and a solution of 1,2-dibromobenzene (270 g) in THF (526 g) were sequentially added to the mixture, the latter in a drop-wise manner. After about twenty minutes, heating was discontinued and the remainder of the 1,2-dibromobenzene was added over a period of about 1.5 hours at such a rate as to maintain a gentle reflux. During the addition, THF was periodically added to maintain a reaction temperature less than about 65° C. After the addition of the 1,2-dibromobenzene was complete, THF (500 mL) was added to the flask and the mixture was heated at 65° C. for 5 hours. Heating was discontinued and the reaction mixture was stirred at room temperature overnight under nitrogen.

THF (500 mL) was added to the mixture and the flask was placed in an ice water bath. A dry-ice condenser was inserted into the top of the water condenser and chlorodimethylsilane (440 g) was added drop-wise to the mixture at such a rate as to maintain reflux. After the addition was complete, the flask was removed from the ice water bath and the mixture was heated at 60° C. overnight. The mixture was cooled to room temperature and treated sequentially with toluene (1000 mL) and saturated aqueous $NH_4Cl$ (1500 mL). The contents of the flask were transferred to a separatory funnel and washed with several portions of water until a substantially transparent organic layer was obtained. The organic layer was removed, dried over magnesium sulfate, and concentrated by distillation until the temperature of the residue reached 150° C. The concentrated crude product was purified by vacuum distillation. A fraction was collected at 125-159° C. under a pressure of 12 mmHg (1600 Pa) to give p-bis(dimethylsilyl)benzene (140 g) as a colorless liquid. The identity of the product was confirmed by GC-MS, FT-IR, $^1$H NMR, and $^{13}$C NMR.

Example 3

This Example demonstrates the preparation of the organohydrogenpolysiloxane resin used in Examples 4 to 8. 1,4-bis(dimethylsilyl)benzene (510 g), 625 g of toluene, and 12.5 g of platinum on carbon (Pt/C) having a platinum content of 5% (w/w), were combined in a 5-L, three-neck, round-bottom flask equipped with a stirrer, a thermometer, a condenser, a heating mantel, a temperature controller, and an addition funnel. The mixture was heated to 80° C. and 1573 g of the organopolysiloxane resin solution of Example 1 was added drop-wise to the mixture with vigorous agitation over a period of 2.5 h. After the addition was complete, the mixture was heated at 80° C. for two more hours. The mixture was allowed to cool to 40° C. and then filtered to remove the Pt/C catalyst. To the filtrate was added 0.12 g of a solution of 20% triphenylphosphine in toluene. $^{29}$Si NMR of the filtered solution showed that the vinyl groups from the vinyl-functional organopolysiloxane resin and one-half the silicon-bonded hydrogen atoms from the 1,4-bis(dimethylsilyl)benzene were consumed. The solid content of solution, determined by measuring the weight loss after drying a sample (2.0 g) of the solution in an oven at 150° C. for 2 h, was 66.3% (w/w).

Example 4

Part A and Part B of the silicone compositions of Examples 5-8 and Comparative Example 1 were prepared as follows: Part A was prepared by combining the organohydrogenpolysiloxane resin solution of Example 3 (1000 g) and 697.5 g of the organopolysiloxane resin solution of Example 1 in a 1 L, round-bottom flask, and then heating the mixture at 80° C. under a vacuum of 5 mmHg (667 Pa) for 2 h to remove most of the toluene. The mole ratio of silicon-bonded hydrogen atoms to vinyl groups in the mixture was 0.93 to 1, as determined by $^{29}$Si NMR.

Part B was prepared by combining the organopolysiloxane resin solution of Example 1 (1000 g) and 222 g of 1,4-bis(dimethylsilyl)benzene in a 3-L, round-bottom flask, and then heating the mixture at 80° C. under a vacuum of 5 mmHg (667 Pa) for 2 h to remove most of the toluene. Additional 1,4-bis(dimethylsilyl)benzene was added to the mixture to achieve a mole ratio of silicon-bonded hydrogen atoms to vinyl groups equal to 1.1:1, as determined by $^{29}$Si NMR.

Example 5

Part A (50 g) and 150 g of Part B, both of Example 4, were thoroughly blended at 60° C. The mixture was treated with Platinum Catalyst, described above, to achieve a platinum concentration of 5 ppm, and then allowed to cool to room temperature. The composition has a viscosity of 8.1 Pa·s. The mechanical and thermal properties of the cured silicone resin are shown in Table 1.

Example 6

Part A (100 g) and 100 g of Part B, both of Example 4, were thoroughly blended at 60° C. The mixture was treated with Platinum Catalyst, described above, to achieve a platinum concentration of 5 ppm, and then allowed to cool to room temperature. The composition has a viscosity of 54.8 Pa·s. The mechanical and thermal properties of the cured silicone resin are shown in Table 1.

Example 7

Part A (150 g) and 50 g of Part B, both of Example 4, were thoroughly blended at 60° C. The mixture was treated with Platinum Catalyst, described above, to achieve a platinum concentration of 5 ppm, and then allowed to cool to room temperature. The composition has a viscosity of 576.2 Pa·s. The mechanical and thermal properties of the cured silicone resin are shown in Table 1.

Example 8

Part A (200 g) of Example 4 was treated with Platinum Catalyst, described above, at room temperature to achieve a platinum concentration of 5 ppm. The composition has a viscosity of 3200 Pa·s. The mechanical and thermal properties of the cured silicone resin are shown in Table 1.

Comparative Example 1

Part B (200 g) of Example 4 was treated with Platinum Catalyst, described above, at room temperature to achieve a platinum concentration of 5 ppm. The composition has a viscosity of 1.8 Pa·s. The mechanical and thermal properties of the cured silicone resin are shown in Table 1.

TABLE 1

| Example | Flexural Modulus (Gpa) | Flexural Strength (MPa) | $K_{IC}$ (MPam$^{1/2}$) | $G_{IC}$ (N/m) | $T_g$ (° C.) | $T_o$ (° C.) |
|---|---|---|---|---|---|---|
| 5 | 1.40 ± 0.07 | 48.45 ± 0.80 | 0.93 ± 0.05 | 619 ± 69 | — | — |
| 6 | 1.39 ± 0.03 | 45.52 ± 0.30 | 1.14 ± 0.05 | 929 ± 85 | 88.1 | 57.0 |
| 7 | 1.37 ± 0.04 | 45.93 ± 1.30 | 1.15 ± 0.02 | 958 ± 34 | — | — |
| 8 | 1.38 ± 0.01 | 46.70 ± 0.70 | 1.19 ± 0.06 | 1027 ± 101 | 86.2 | 56.1 |
| Comp. 1 | 1.47 ± 0.05 | 50.50 ± 1.40 | 0.92 ± 0.02 | 573 ± 30 | 92.8 | 64.4 |

— Denotes a value not measured, $K_{IC}$ is plane-strain fracture toughness, $G_{IC}$ is critical strain energy release rate, $T_g$ is glass transition temperature, and $T_o$ is onset temperature.

That which is claimed is:

1. An organohydrogenpolysiloxane resin having the formula:

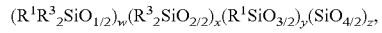

$(R^1R^3{}_2SiO_{1/2})_w(R^3{}_2SiO_{2/2})_x(R^1SiO_{3/2})_y(SiO_{4/2})_z,$ wherein $R^1$ is $C_1$ to $C_{10}$ hydrocarbyl or $C_1$ to $C_{10}$ halogen-substituted hydrocarbyl, both free of aliphatic unsaturation, $R^3$ is $R^1$ or an organosilylalkyl group having at least one silicon-bonded hydrogen atom, w is from 0 to 0.8, x is from 0 to 0.6, y is from 0 to 0.99, z is from 0 to 0.35, w+x+y+z=1, y+z/(w+x+y+z) is from 0.2 to 0.99, w+x/(w+x+y+z) is from 0.01 to 0.8, and at least 50 mol % of the groups $R^3$ are organosilylalkyl.

2. The organohydrogenpolysiloxane resin according to claim 1, wherein at least 65 mol %, of the groups $R^3$ in the resin are organosilylalkyl.

3. The organohydrogenpolysiloxane resin according to claim 1 or 2, wherein the resin has a number-average molecular weight of from 500 to 10,000.

4. A silicone composition, comprising:
(A) an organopolysiloxane resin having an average of at least two silicon-bonded alkenyl groups per molecule, wherein the resin has the formula:

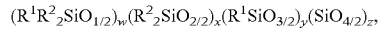

$(R^1R^2{}_2SiO_{1/2})_w(R^2{}_2SiO_{2/2})_x(R^1SiO_{3/2})_y(SiO_{4/2})_z,$ wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.8, x is from 0 to 0.6, y is from 0 to 0.99, z is from 0 to 0.35, w+x+y+z=1, y+z/(w+x+y+z) is from 0.2 to 0.99, w+x/(w+x+y+z) is from 0.01 to 0.8, and at least 50 mol % of the groups $R^2$ are alkenyl;

(B) an organosilicon compound having an average of at least two silicon-bonded hydrogen atoms per molecule in an amount sufficient to cure the composition, wherein the organosilicon compound comprises at least 0.5% (w/w) of an organohydrogenpolysiloxane resin having the formula $(R^1R^3{}_2SiO_{1/2})_w(R^3{}_2SiO_{2/2})_x(R^1SiO_{3/2})_y(SiO_{4/2})_z$, wherein $R^1$ is $C_1$ to $C_{10}$ hydrocarbyl or $C_1$ to $C_{10}$ halogen-substituted hydrocarbyl, both free of aliphatic unsaturation, $R^3$ is $R^1$ or an organosilylalkyl group having at least one silicon-bonded hydrogen atom, w is from 0 to 0.8, x is from 0 to 0.6, y is from 0 to 0.99, z is from 0 to 0.35, w+x+y+z=1, y+z/(w+x+y+z) is from 0.2 to 0.99, w+x/(w+x+y+z) is from 0.01 to 0.8, and at least 50 mol % of the groups $R^3$ are organosilylalkyl; and (C) a catalytic amount of a hydrosilylation catalyst.

5. The silicone composition according to claim 4, wherein at least 65 mol % of the groups $R^2$ in the organopolysiloxane resin of component (A) are alkenyl.

6. The silicone composition according to claim 4, wherein the organopolysiloxane resin of component (A) has a number-average molecular weight of from 500 to 10,000.

7. The silicone composition according to claim 4, wherein component (B) comprises at least 50% (w/w) of the organohydrogenpolysiloxane resin.

8. The silicone composition according to claim 7, wherein component (B) is the organohydrogenpolysiloxane resin.

9. The silicone composition according to claim 4, wherein the organosilicon compound is an organohydrogensilane having the formula $HR^1{}_2Si-R^4-SiR^1{}_2H$, wherein $R^1$ is $C_1$ to $C_{10}$ hydrocarbyl or $C_1$ to $C_{10}$ halogen-substituted hydrocarbyl, both free of aliphatic unsaturation, and $R^4$ is a hydrocarbylene group having a formula selected from:

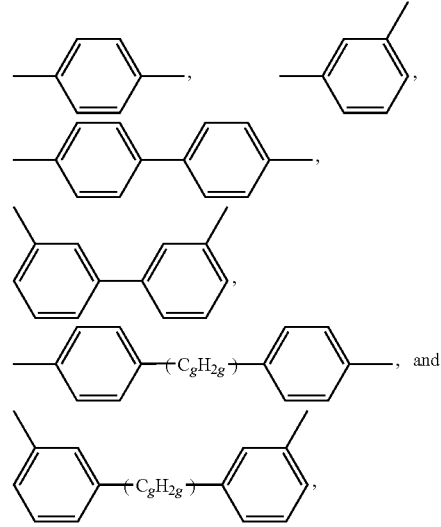

wherein g is from 1 to 6.

10. The silicone composition according to claim 4, further comprising (D) a reactive diluent comprising (i) an organosiloxane having an average of at least two silicon-bonded alkenyl groups per molecule and a viscosity of from 0.001 to 2 Pa·s at 25° C., wherein the viscosity of (D)(i) is not greater than 20% of the viscosity of component (A) of the silicone composition and the organosiloxane has the formula $(R^1R^2{}_2SiO_{1/2})_m (R^2{}_2SiO_{2/2})_n(R^1SiO_{3/2})_p(SiO_{4/2})_q$, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, m is 0 to 0.8, n=0 to 1, p=0 to 0.25, q=0 to 0.2, m+n+p+q=1, and m+n is not equal to 0, provided when p+q=0, n is not equal to 0 and the alkenyl groups are not all terminal, and (ii) an organohydrogensiloxane having an average of at least two silicon-bonded hydrogen atoms per molecule and a viscosity of from 0.001 to 2 Pa·s at 25° C., in an amount sufficient to provide from 0.5 to 3 moles of silicon-bonded hydrogen atoms in (D)(ii) per mole of alkenyl groups in (D)(i), wherein the organohydrogensiloxane has the formula $(HR^1{}_2SiO_{1/2})_s(R^1SiO_{3/2})_t(SiO_{4/2})_v$, wherein $R^1$ is $C_1$ to $C_{10}$ hydrocarbyl or $C_1$ to $C_{10}$ halogen-substituted hydrocarbyl, both free of aliphatic unsaturation, s is from 0.25 to 0.8, t is from 0 to 0.5, v is from 0 to 0.3, s+t+v=1, and t+v is not equal to 0.

* * * * *